United States Patent [19]

Lechner

[11] 4,328,875
[45] May 11, 1982

[54] SCALE WITH DIGITAL DISPLAY OF AVAILABLE WEIGHT RANGE

[75] Inventor: Hans-Peter Lechner, Wetzikon, Switzerland

[73] Assignee: Mettler Instrumente AG, Greifensee, Switzerland

[21] Appl. No.: 138,161

[22] Filed: Apr. 7, 1980

[30] Foreign Application Priority Data

Jul. 6, 1979 [CH] Switzerland .................. 6329/79

[51] Int. Cl.³ .................. G01G 13/14; G01G 19/04
[52] U.S. Cl. .................. 177/165; 177/25; 177/DIG. 3
[58] Field of Search .......... 177/164, DIG. 3, 165, 177/25

[56] References Cited

U.S. PATENT DOCUMENTS

| | | | |
|---|---|---|---|
| 3,812,923 | 5/1974 | Rock | 177/DIG. 3 |
| 4,108,262 | 8/1978 | Anderson | 177/164 |
| 4,114,706 | 9/1978 | Realini et al. | 177/165 X |
| 4,149,605 | 4/1979 | Mettler et al. | 177/DIG. 3 |
| 4,171,026 | 10/1979 | Gallo et al. | 177/DIG. 3 |

OTHER PUBLICATIONS

Terms and Definitions for The Weighing Industry, Scale Manufacturers Association, One Thomas Circle, Wash. 5, D.C., 1958, p. 84.

Primary Examiner—George H. Miller, Jr.
Attorney, Agent, or Firm—Marianne Rich

[57] ABSTRACT

In a scale having a digital display, the available weight range, that is the difference between the maximum allowable weight on the scale and the then-present weight on the scale, is displayed in response to activation of the tare key. The available weight range number may be displayed for a predetermined time interval or it may be displayed while the tare key is depressed, release of the tare key causing the normal display of net weight to resume.

6 Claims, 2 Drawing Figures

SCALE WITH DIGITAL DISPLAY OF AVAILABLE WEIGHT RANGE

The present invention relates to scales having digital displays, and, more particularly, to scales which also have a tare key which activates a subtractive tare computation so that the net weight of the load on the scale can be displayed. Even more particularly, it relates to scales which also furnish an indication of the remaining available weight, that is the weight range from the load then present on the scale to the maximum load which may be weighted on the scale.

BACKGROUND AND PRIOR ART

Scales of the above described type are particularly useful when components of a mixture are to be measured successively and the operator of the scale wishes to know how much of the available weight range has been used up or is still available.

Earlier systems provided indicator instruments separate from the digital display of the scale. Later, the indicator instruments were displaced by displays utilizing light emitting diodes. Subsequently, it was decided that the display of the available weight range could also be digital display. In order that the same display could be used both for net weight and the available weight range, a separate operator-controlled element was provided which could call out the available weight range number for display, that is would switch the display so that the available weight range number would be displayed instead of the net weight.

SUMMARY OF THE INVENTION

It is an object of the present invention to furnish a scale of the above-described type which, however, is easier both to manufacture and to operate.

In accordance with the system and method of the present invention, operation of the tare key causes a display of the available weight range number. This eliminates the need for a separate operating key and also allows the operator of the scale to receive the desired information without doing more than he would do in any case, namely operate the tare key.

In a particularly preferred embodiment of the present invention, the available weight range is displayed for a predetermined time interval (for example several seconds) after activation of the tare key. After the predetermined time interval, the equipment automatically returns to normal operation, that is the net weight is again indicated. In another and particularly preferred embodiment, the display of the available weight range takes place only as long as the tare key is depressed. As soon as the tare key is released, the scale returns to its normal operation.

The last-mentioned embodiment has a number of advantages. First, the operator has a display of the available weight range as long as he desires it, that is the length of time that the available weight range is displayed is individually adjustable. Further, by releasing the tare key immediately, the operator can eliminate the display of the available weight range entirely.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 shows a block diagram of a scale in accordance with the present invention; and FIG. 2 is a flow chart for the microprocessor shown in FIG. 1.

DESCRIPTION OF THE PREFERRED EMBODIMENT

Figure 1:
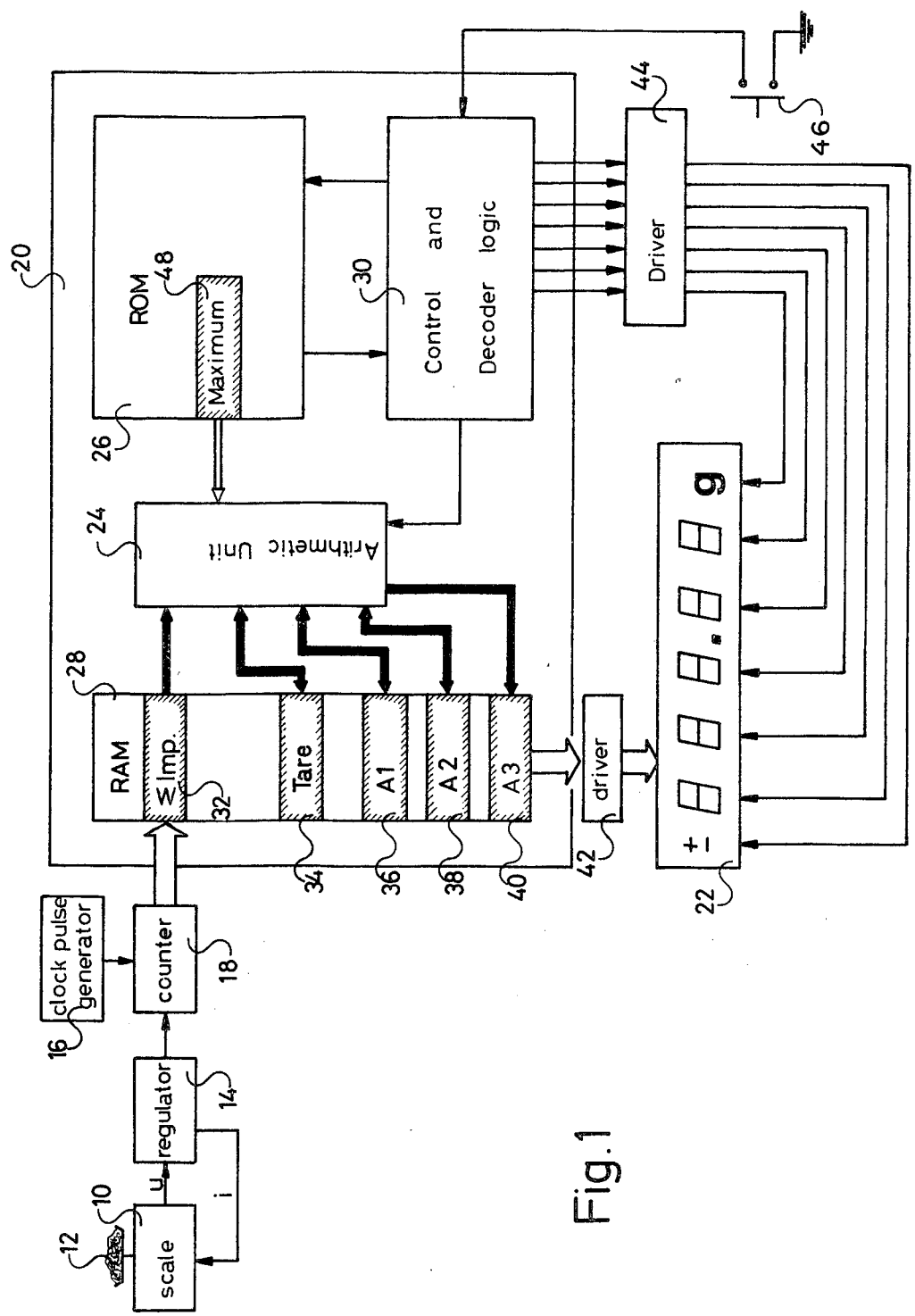

The present invention will be described as incorporated in a scale having electromagnetic load compensation as, for example, described in U.S. Pat. Nos. 3,786,884 and 3,816,156. The operation of such scales is well known. It will only be briefly summarized here for convenience.

A scale 10 has a movable part which is displaced under the action of a load 12. The scale furnishes an electrical signal u which corresponds to the displacement of the movable member from a reference position. The signal u is converted to a current i in a regulator 14. Load 12 is maintained in an equilibrium position by the application of load-proportional current i to a magnetic circuit which balances the effect of the load. The current i consists of pulses of constant amplitude and load-dependent width. Specifically, pulses furnished by a clock pulse generator 16 are counted on a counter 18 throughout the duration of each pulse, so that the count on counter 18 constitutes a measure of the load. The counts on counter 18 (which correspond to partial-load measurements) are transferred periodically to a microcomputer 20. In microcomputer 20 these are summed, further computations are carried out, and the result is then forwarded to a seven-segment indicator 22.

Microcomputer 20 consists of an arithmetic unit 24, a storage for constants (ROM) 26, a random access memory (RAM) 28 and a control and decoder logic 30. RAM 28 includes the following storage locations: a storage 32 for storing the sum of pulses which signify the gross weight of the load then-present on the scale; a tare storage 34; and three display storages 36, 38 and 40. The number to be displayed is stored in binary form in storage 36, in BCD code in storage 38 and in the code suitable for a seven-segment indicator in storage 40.

Driver circuits 42 and 44 are connected between display 22, and storage 40 and decoder and control logic 30, respectively. Operation of tare key 46 causes initiation of a tare computation and net weight display by control and decoder logic 30.

The above-described apparatus is known, and is modified as follows in accordance with the present invention: storage 26 includes a set of storage locations (register) 48 which stores the maximum allowable weight number, that is the pulse sum which signifies the maximum gross weight which may be applied to the scale. As soon as tare key 46 is activated, a special program is initiated in microcomputer 20 which allows the difference between the maximum allowable weight and the actual weight then present on the scale to be displayed.

Figure 2:
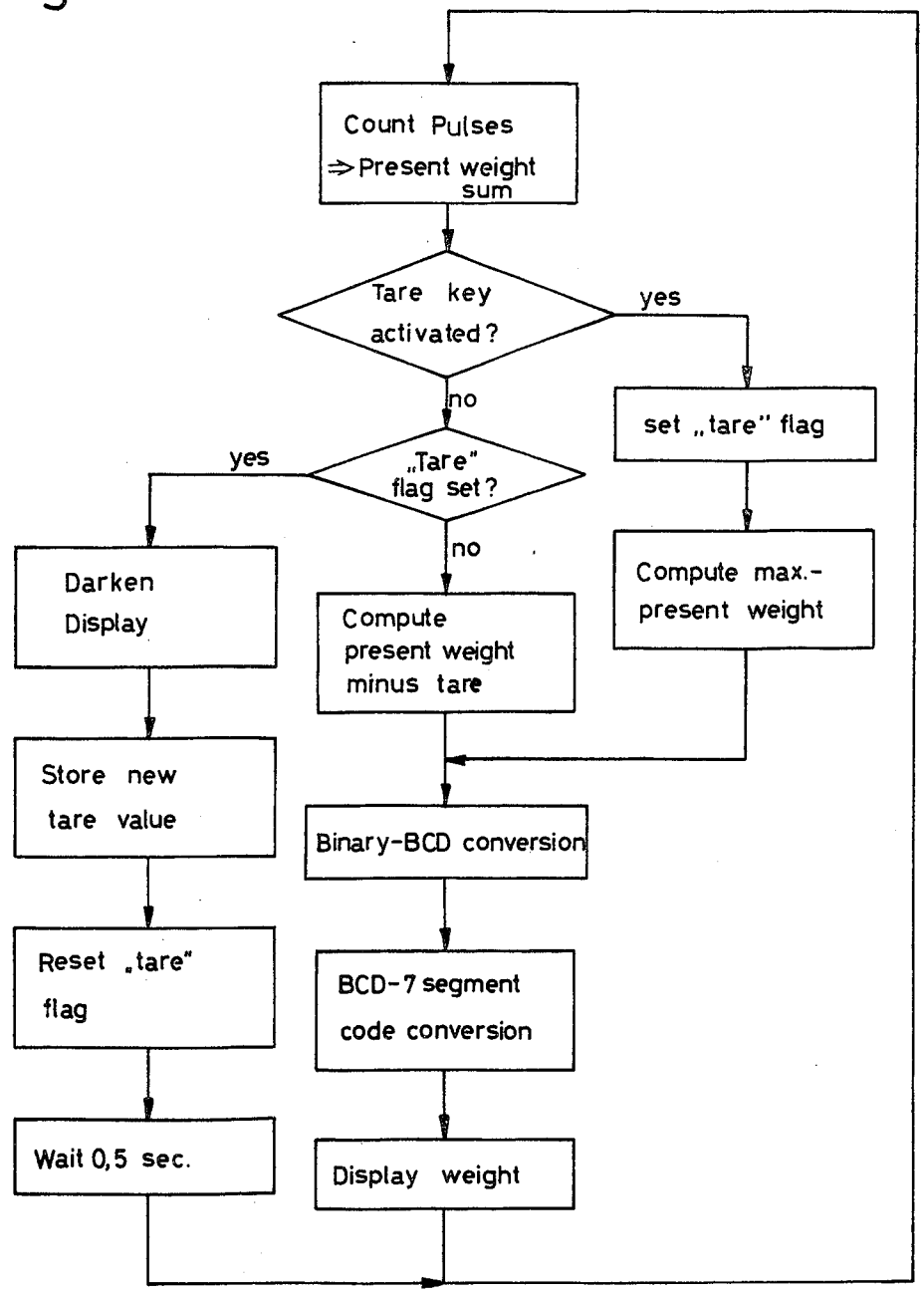

FIG. 2 shows a flow chart of that portion of the program of microcomputer 20 which is of interest relative to the present invention:

First, as explained relative to FIG. 1, pulses are counted during load-dependent time intervals in a binary counter. After a predetermined number of these time intervals, the total number of pulses received during this predetermined number of time intervals is summed.

Following the creation of each sum, the state of tare key 46 is tested: is it activated or not activated?

(a) Generally, tare key 46 is not activated. Under these conditions, the state of a "tare" flag is sampled, and, if it is not set, the content of tare storage 34 is subtracted from the pulse sum and the difference, that is the actual net weight, is displayed after conversion from a binary number to the BCD code and then to the code for the seven-segment indicator.

(b) If the tare key is activated, a "tare" flag is set (rightmost branch in the flow chart of FIG. 2), and the then-present sum of pulses (signifying the gross weight then on the scale) is subtracted from the maximum (48) allowable weight. The difference corresponds to the available weight range. This, after the code conversion described above, is applied to the display. This mode of operation remains as long as tare key 46 is activated. Every time a new pulse sum has been computed, the new available weight range is computed and displayed.

(c) If tare key 46 is released, the normal tare computation (FIG. 2 on the lefthand side) is initiated: first, the display is darkened. Next, the new tare value is entered into tare storage 34, i.e. written over the previous tare value. The "tare" flag is then reset and, after an interval in which the display remains dark, the normal program (according to the central branch in FIG. 2) is resumed. The net weight is again displayed.

In some cases, it may be necessary to recompute the maximum allowable weight (48) during each step of the weighing operation. This may be required because of calibrating regulations. However, the program can be easily modified to include such a recomputation. Scales wherein such a recomputation is necessary therefore are to be included in the present invention.

It should also be understood that, although the present invention is illustrated using a microcomputer, the system and method of the present invention can also be carried out with equipment utilizing discreet building blocks or integrated circuits.

The invention further is not to be limited to scales with electromagnetic load compensation, since scales operating on other principles can readily accommodate it.

It is also to be understood that the flow chart of FIG. 2 can be modified in any number of ways without departing from the basic concept of the present invention.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Scale for measuring the weight of a load applied thereto up to a predetermined maximum weight, comprising, display means for furnishing a visual display in response to electrical signals applied thereto;
means for generating a gross weight signal signifying the then-present total weight on said scale;
a tare key; and
computing means responsive to activation of said tare key for computing an available weight range signal from said gross weight signal and said predetermined maximum weight and a net weight signal from said gross weight signal and said tare signal, and for applying the so computed available weight range signal and net weight signal to said display means in a predetermined order, whereby said display means displays both said available weight range number and said net weight number in responsive to activation of said tare key.

2. A scale as set forth in claim 1, wherein said display means comprises digital display means.

3. A scale as set forth in claim 1, wherein said computing means applies said available weight range signal to said display means throughout activation of said tare key and applies said net weight signal to said display means following release of said tare key.

4. A scale as set forth in claim 1, wherein said computing means applies said available weight range signal to said display means for a predetermined time interval following activation of said tare key, and applies said net weight signal to said computing means thereafter.

5. In a scale for weighing loads having weights up to a predetermined maximum weight, said scale having means responsive to external activation for initiating tare computations, tare storage means, and display means for furnishing a visual display in response to electrical signals applied thereto, a method for displaying net weight and an available weight range number signifying the difference between said predetermined maximum weight and the weight of the load then-present on said scale, comprising the steps of interrogating said tare computation initiating means;
responsive to activation of said tare computation initiating means: storing said weight of said load then present on said scale in said tare storage means;
computing said available weight range number and applying electrical signals corresponding thereto to said display means, whereby said display means furnishes a visual display of said available weight range number;
computing a net weight number signifying the net weight of said load then present on said scale;
and subsequently blocking said electrical signals signifying said available weight range number from said display means and applying instead electrical signals signifying said net weight number;
if said tare computation initiating means is not activated:
computing said net weight number and applying electrical signals corresponding thereto to said display means, whereby said display means displays the net weight of said load then present on said scale.

6. A method as set forth in claim 5, further comprising the step of setting a "tare" flag in response to activation of said tare computation initiating means;
wherein said step of computing said available weight range number comprises computing said available weight range number only if said tare flag is set;
wherein said step of storing said weight in said tare storage means comprises storing said weight in said tare storage means only if said tare storage computation means is not activated and said "tare" flag is set;
further comprising the steps of resetting said "tare" flag and darkening said display for a predetermined time interval if said tare computation activating means is not activated and said "tare" flag is set, whereby said display means furnishes a visual display of said available weight range number only while said tare computation initiating means is activated.

* * * * *